May 20, 1952  H. F. DIES ET AL  2,597,623
APPARATUS FOR MANUFACTURING TAPER TUBING
Filed Oct. 31, 1947  3 Sheets-Sheet 3

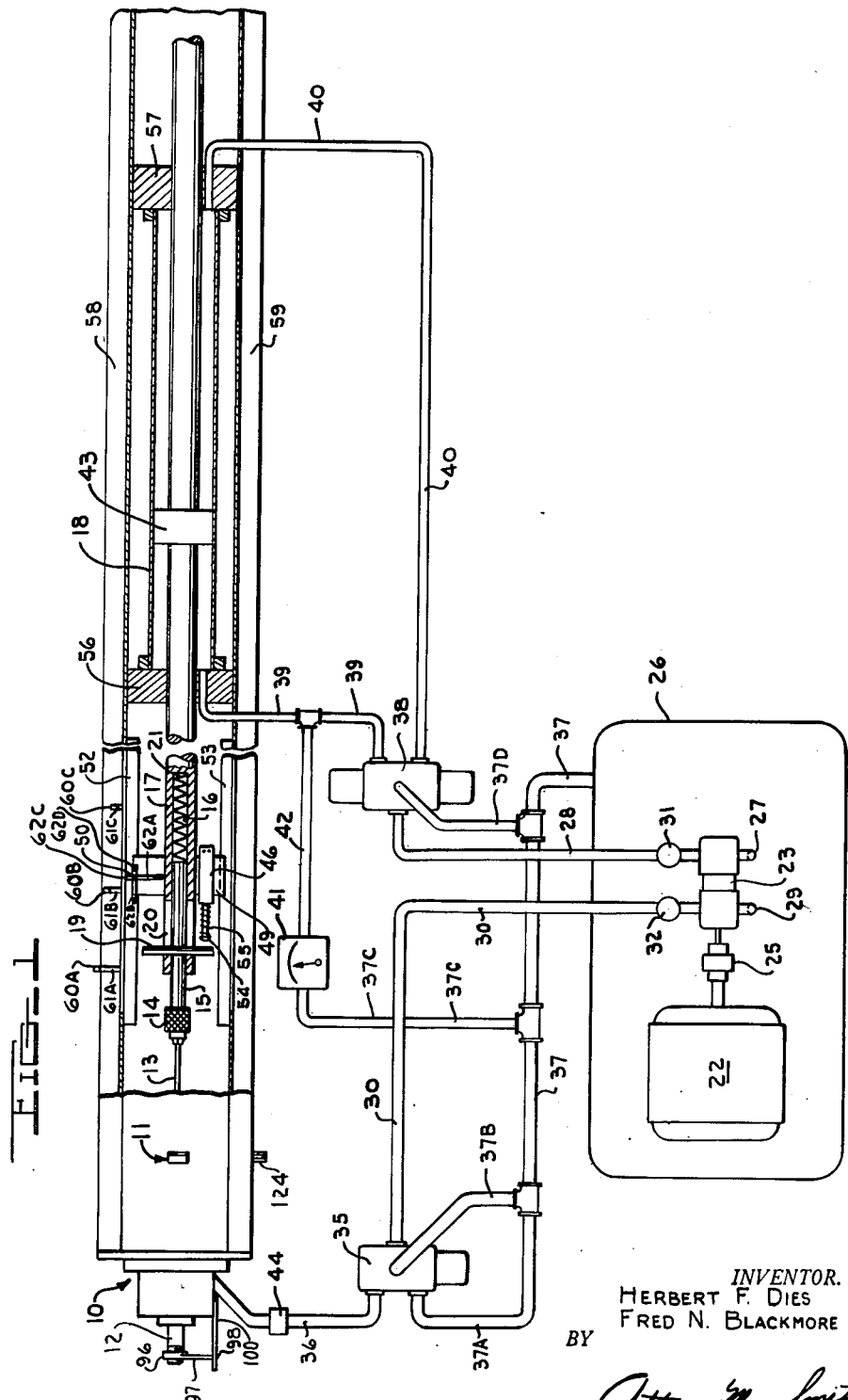

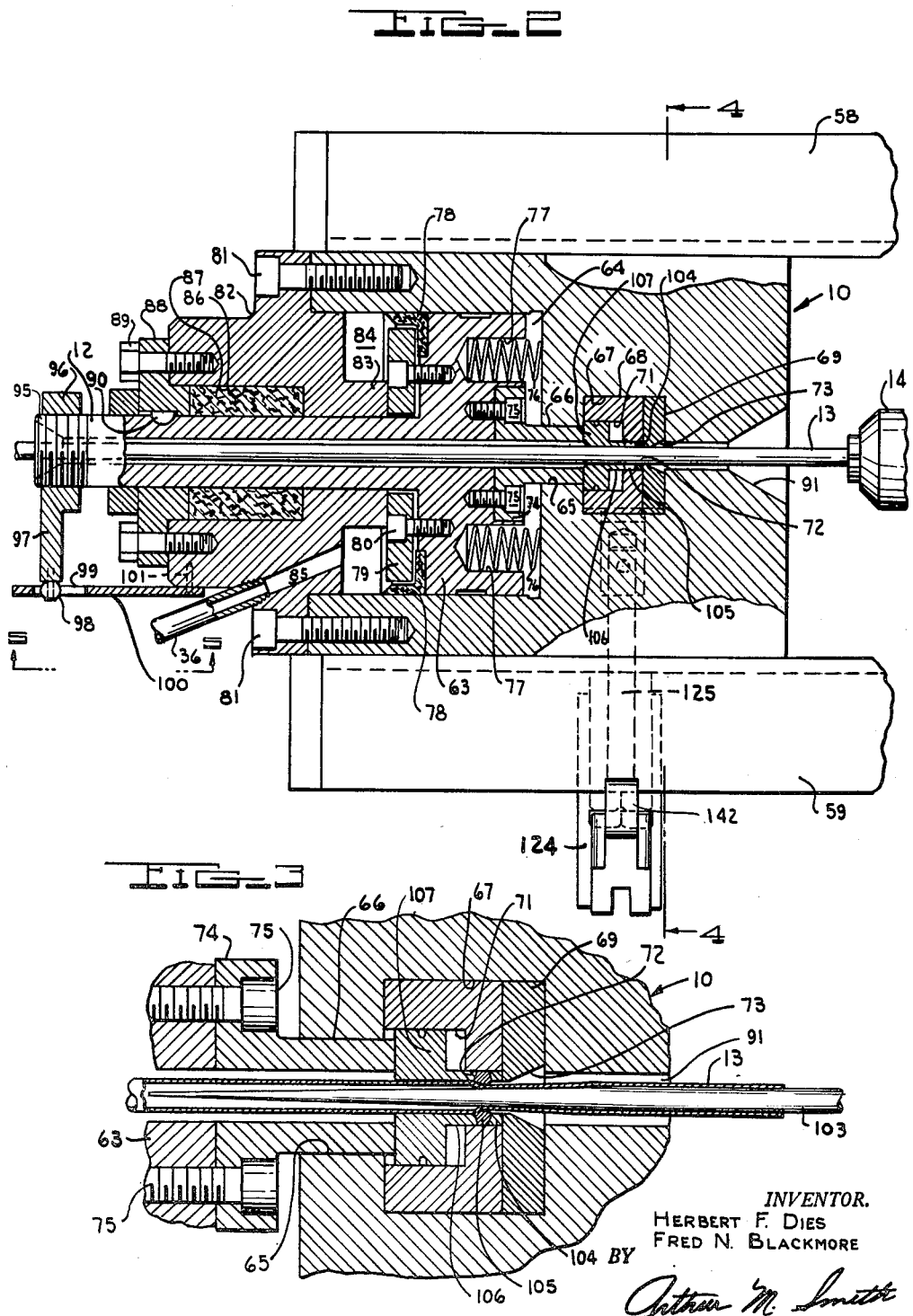

INVENTORS.
HERBERT F. DIES
FRED N. BLACKMORE
BY
*Arthur M. Smith*
ATTORNEY

Patented May 20, 1952

2,597,623

UNITED STATES PATENT OFFICE 2,597,623

APPARATUS FOR MANUFACTURING TAPER TUBING

Herbert F. Dies, Detroit, and Fred N. Blackmore, Ferndale, Mich., assignors to Hurd Lock and Manufacturing Company, Detroit, Mich., a corporation of Michigan Application October 31, 1947, Serial No. 783,420

2 Claims. (Cl. 205—3)

The present invention relates to an apparatus for manufacturing tapered tubing and has for its primary objects:

To provide an apparatus for carrying out the present invention and which may be readily adjusted for tapering tubing of different cross sectional shapes and sizes, and which may also be readily adapted and controlled to provide a uniform taper or a desired variable taper along the length of the tube being tapered; and To provide an apparatus which is particularly but not exclusively adapted to the economical manufacture of fishing poles by mass production methods.

Other objects of this invention will appear in the following description and appended claims, reference being had to the accompanying drawings forming a part of this specification wherein like reference characters designate corresponding parts in the several views.

In the drawings:

Fig. 1 is a fragmentary, partially sectioned, semi-schematic plan view of a tube tapering apparatus embodying the present invention, shown in connection with a diagrammatic plan of the hydraulic circuits employed therewith.

Fig. 2 is essentially an enlarged fragmentary horizontal section through the tapering die, taken at the level of the tube being tapered thereby.

Fig. 3 is essentially a fragmentary enlargement of the section shown in Fig. 2, showing details of the tapering die in operation with a tapered mandrel.

Fig. 4 is essentially a section through the tapering die detent mechanism taken in the direction of the arrows along the line 4—4 of Fig. 2.

Fig. 5 is essentially a fragmentary enlarged section taken in the direction of the arrows along the line 5—5 of Fig. 2, showing a fragmentary elevation of the accelerator cam.

Before explaining the present invention in detail, it is to be understood that the invention is not limited in its application to the deails of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Briefly, the present invention proposes the drawing of a tube to be tapered through the aperture of a deformable tube constricting member, which may be an annulus of a malleable metal such as soft iron, copper, aluminum, or the like, although rubber and various plastic materials are also suitably employed. It will be apparent from the following that a wide range of suitable materials will readily suggest themselves to those skilled in the arts of metal working for use as the deformable tube constricting member. As the tube to be tapered is drawn through the aperture of the deformable tube constricting member, the latter is simultaneously compressed around the tube so as to constrict and effect a gradual taper to the tube.

In the tapering of long lengths of tubing, it is usually preferable to carry out the process in a number of steps. Thus, after the tube has been tapered for a convenient length depending upon the size of the tube and the rate of the taper, the constricting member is replaced by a similar undeformed constricting member having an initial aperture essentially the same size as the constricted aperture of the deformed member being replaced. Upon replacement of each deformed tube constricting member, the tapering process briefly outlined above is continued along the tube from the point of cessation of the succeeding tapering operation so as to effect a continuous taper without a noticeable break. A tapered mandrel may be employed, or not, as desired, within the tube being tapered as a form or guide to limit the extent of the taper.

A particular embodiment of the present invention is shown by way of example in the drawings wherein Fig. 1 shows the housing, indicated generally by the numeral 10, within which the die holder, indicated generally by the numeral 11, is slidably mounted. A tubular tube guide 12, Fig. 2, extends longitudinally through a portion of the housing 10 and guides the tube 13 to be tapered to the tapering die within the die holder 11. The tube 13 is gripped by the jaws of the chuck 14 and is drawn from left to right in Figs. 1 and 2 through the tapering die, so that the large end of the tube 13 is at the right and the taper progresses to the left as the tube 13 is drawn through the tapering die. The chuck 14 is secured to the end of the shaft 15 which is slidably mounted within the cylindrical opening 16 of the plunger 17 of the hydraulic ram 18. The limits of the sliding movement of the shaft 15 are determined by the pin 19 which extends through the shaft 15 and is slidable within the movement limiting slot 20 at the leftward portion of the plunger 17. The shaft 15 is resiliently forced to the left in Fig. 1 by the coil spring 21 within the cylindrical opening 16 and under compression between the end of the shaft 15 and the base of the opening 16.

The actuation and control of the tapering operation is effected by the hydraulic system shown diagrammatically in Fig. 1. Details of the hydraulic apparatus and electrical controls utilized with the preferred embodiment of the present invention are not described herein since these are well known to the art, and other hydraulic systems may be readily employed to achieve the results of the present invention without departing from the spirit thereof.

The electric motor 22 is operatively coupled with the double hydraulic pump 23 by means of the rotatable drive shaft 25. The pump 23 draws hydraulic fluid from the reservoir 26 through the intake duct 27 and discharges the fluid under pressure through the discharge duct 28. Likewise, the pump 23 draws fluid from the reservoir 26 through the intake duct 29 and discharges it under pressure through the duct 30. Independently adjustable pressure regulating valves 31 and 32 are provided within the ducts 28 and 30, respectively. The duct 30 communicates with the electric solenoid operated four-way valve 35, which may be selectively operated to connect the hydraulic pressure of duct 30 with the duct 36 leading to the compression mechanism of the tapering die, or to by-pass the duct 36 by connecting the duct 30 with the return duct 37, via the connector duct 37A, and simultaneously to release the pressure in duct 36 via the connector duct 37B into the return duct 37, which latter communicates with the reservoir 26.

The duct 28 communicates with an electric solenoid operated four-way valve 38, which may be selectively operated to connect the hydraulic pressure of duct 28 with the left or "drawing" end of the hydraulic ram 18 by the duct 39, or to the right or "return" end of the ram 18 through the duct 40. When hydraulic pressure is supplied to the "drawing" end of the ram 18 through the duct 39, the plunger 17 and connected shaft 15 and chuck 14 are drawn to the right in Fig. 1, and the tube 13 is drawn through the tapering die. The rate at which the tube 13 is drawn through the tapering die is precisely controlled by the adjustable control valve 41, connected with the duct 39 by the duct 42 so as to provide an adjustable by-pass for ram 18.

The more valve 41 is opened, the greater will be the effective by-pass of the ram 18 by hydraulic fluid through duct 42 and into the return duct 37 via the connector duct 37C. Correspondingly, the slower will the ram 18 be actuated to draw the tube 13 through the tapering die. In addition to selectively supplying hydraulic fluid under pressure from duct 28 to one of said ducts 39 or 40, the valve 38 simultaneously connects the other of said ducts 39 or 40 to the discharge duct 37 via the connector duct 37D. Thus as hydraulic pressure is supplied to one side of the piston 43, the hydraulic pressure on the other side of the piston 43 is released to the reservoir 26. In order to assure that the pressure in the duct 36 has reached a predetermined minimum value required to initiate the deformation of the tapering die before the ram 18 is actuated to draw the tube 13 through the die, a pressure switch 44 is provided in the line 36. The switch 44 is electrically connected with the solenoidal valve 38 for actuation thereof, so as to cause the plunger 17 to be moved to the right when the said predetermined pressure is developed in line 36.

Other general features of the apparatus shown in Fig. 1 include the electrical limit switch 46 mounted on the slidable plunger support 49, which is secured to the end of the plunger 17 for movement therewith and is slidably supported at its opposite ends by the slideways 52 and 53. If for any reason the tube 13 should jam within the tapering die while moving leftward, the shock will be absorbed by compression of the spring 21. The pin 19 will contact the spring pressed button 54, normally resiliently held to the left by the spring 55, and trip the limit switch 46 so as to actuate the valve 38 and stop the movement of the said plunger 17 to the left. In the present instance, the plunger arm 17 extends completely through the cylinder heads 56 and 57, which receive the hydraulic ducts 39 and 40, respectively, at the opposite sides of the piston 43. The piston 43 is secured to the plunger 17 for actuation thereof in response to the direction of the hydraulic flow in the ducts 39 and 40. The entire apparatus, including the slide supports 52 and 53, is supported on opposite sides by the load supporting channel beams 58 and 59.

When a long length of tubing is to be tapered, requiring a series of tapering operations as outlined above, the length of the draw for each tapering operation is predetermined and maintained essentially uniform by a series of limit switches adjustably spaced longitudinally of the plunger 17 at distances equal to the desired lengths of taper to be achieved during each successive tapering operation. A cam means is adjustably secured to a portion of the plunger apparatus for moving with the plunger 17 and is adapted for adjustment so as to selectively contact and trip one of the longitudinally spaced limit switches. The limit switches are operatively connected electrically with the solenoid operated valve 35 for actuation thereof so as to release the hydraulic pressure in the duct 36 to the reservoir 26 via ducts 37B and 37.

At the beginning of a tapering operation, the cam means for tripping the limit switches is adjusted for tripping the first limit switch in the series as the plunger 17 moves from left to right during the tapering operation. Similarly, the first limit switch in the series is selectively adjusted longitudinally of the movement of the plunger 17 and secured at a position whereat it will be tripped when the tapering process has progressed for such a length along the tube 13 that an essentially uniformly tapered pitch is no longer practicable. Thus, when the tube 13 is moved to the right through the tapering die for such a distance that a uniform taper is no longer practicable, the first limit switch in the series will be tripped and the solenoidal valve 35 will accordingly be actuated to release the pressure on the tapering die, preventing continued tapering of the tube 13.

The second tapering operation will commence at the small end of the taper which was produced during the preceding tapering operation. For the second tapering operation, the limit switch contacting cam is adjusted so as not to trip the first limit switch in the series, but to trip the second limit switch in the series spaced at a distance to the right of the first limit switch equal to the desired length of taper to be achieved in the second tapering operation.

Various arrangements of a series of limit switches and of the limit switch contacting cams may be provided for tripping each succeeding limit switch in the series in its turn when each succeeding tapering operation has progressed for a desired predetermined extent. Accordingly, the particular form and arrangement of the series of limit switches 60 and limit switch contacting cams 62 shown in the drawing, Fig. 1, are not essential to the present invention and are shown merely by way of example.

The series of limit switches 60, differentiated by the letters A, B, and C, extend upright from their respective horizontal supporting brackets 61, correspondingly differentiated by the letters A, B, and C. The brackets 61 are of graded lengths and are preferably slidably adjustable longitudinally of the slide member 52, to which they are secured in their adjusted positions.

The pivotally movable cam arms 62, differentiated by the letters A, B, C, and D, are projected radially for graded distances from a central hub 50, pivotally secured to the cross bar 49 for rotation about a vertical pivot axis. By selectively rotating the cam arms 62, one of them will be selectively extended perpendicularly to the slide 52 for tripping a corresponding limit switch 60 as the plunger 17 moves from left to right during a tapering operation.

By the arrangement shown, the longest cam arm 62A is adapted to contact and trip the first limit switch 60A at the left of the series. The shorter cam arm 62B is adapted to miss the limit switch 60A, but to trip the limit switch 60B. Similarly, each successively shorter cam arm 62 is adapted to contact and trip the corresponding limit switch 60 on the successively shorter brackets 61, but to miss the preceding limit switches 60 on the longer brackets 61. Three limit switches 60 and four cam arms 62 are shown in the present illustration. It is apparent that a greater number of limit switches 60 and cam arms 62 will be employed where required.

As the plunger 17 is hydraulically moved to the right, and one of the switches 60 is tripped by its corresponding cam arm 62, the solenoidal valve 35 is actuated to release the pressure in the duct 36 to the return duct 37 via the connector duct 37B, and thereby to stop the compression stroke on the tapering die. Upon continued movement of the plunger 17 to the right, the tube 13, which has been tapered for a portion of its length, is drawn through the die and uniformly reduced in diameter for the remainder of its length to the diameter of the small end of the taper whereat the compression stroke on the tapering die ceased. Upon the continued movement of the plunger 17 to the right after the compression stroke has ceased, the cam arm 62, which tripped its corresponding limit switch 60 and thereby stopped the tapering action, will contact the succeeding limit switches 60 in the series. However, no action will result since the compression stroke on the tapering die has already been stopped.

Fig. 2 shows a section through the tapering die, with a tube 13 to be tapered extending through the tapering die and the tubular tube guide 12. The tube guide 12 has the enlarged head 63 slidably mounted concentrically within the cylindrical opening 64 of the housing 10. A cylindrical opening 65, concentric with the tube guide 12, extends into the housing 10 from the opening 64 and is provided for the slidable tubular plunger 66. Also within the housing 10 and communicating with the opening 65 is the longitudinal opening 67 for the slidably movable die holder 11. The die holder 11 comprises the longitudinal compression chamber housing 68 and the longitudinal base plate 69, which are secured to each other at opposite ends by the screws 70, Fig. 4.

The longitudinal compression chamber housing 68 carries the plurality of spaced cylindrical chambers 71, each communicating with one of each of the plurality of smaller concentric compression chambers 72, see enlargement, Fig. 3. The longitudinal base plate 69 carries the plurality of tapered openings 73, one of each being concentric with one of each of the compression chambers 72. By virtue of an indexing means described in detail below, the die holder 11 may be selectively indexed to position any one of the cylindrical chambers 71 in concentricity with the tube guide 12 and with the corresponding tapered opening 73 concentric with and flaring outward to communicate with the small end of the funnel-shaped opening 91, which leads to the exterior of the housing 10. At the right, Fig. 2.

Thus a continuous passage between the tube guide 12 and the jaws of the chuck 14 may be aligned for the tube 13.

The annular plunger 66 provides the enlarged flange head 74 which is counterbored within the tube guide head 63 and secured thereto by the plurality of bolts 75, Fig. 3. The head 63 is spring pressed to the left in Fig. 2 by the plurality of springs 76 under compression between the housing 10 and the base of the cylindrical spring-guide holes 77 provided by the head 63. Around the periphery of the head 63, opposite the springs 76, is the ring of packing 78, held in place by the retaining ring 79 which is secured to the head 63 around the tube guide 12 by the plurality of bolts 80.

Also projected into the cylinder opening 64 and secured to the housing 10 by the plurality of bolts 81 is the collar 82 within which the tube guide 12 is slidably mounted. The collar 82 limits the leftward movement of the head 63 by contact between the retaining ring 79 and the annular boss 83. The boss 83 projects from the collar 82 around the tube guide 12 and provides the inner boundary for the annular chamber 84. The collar 82 also provides the oil duct 85 which communicates between the annular chamber 84 and the hydraulic fluid duct 36. An oil packing gland 86 is provided within the collar 82 around the tube guide 12 for the chevron packing 87 which is held in place by the annular capping plate 88. The capping plate 88 is secured to the collar 82 by the plurality of bolts 89 and is keyed by the key 90 to the tube guide 12 to prevent rotation of the latter.

The leftward end of the tube guide 12 projects through the capping plate 88 and provides the left hand screw-threaded portion 95 in screw driven engagement with the internally threaded control member 96 having the laterally extending arm 97. The outer extremity of the arm 97 provides the cam follower roller pin 98 within the diagonally extending cam groove 99 provided by the cam arm 100, Fig. 5. The cam arm 100 is secured to the collar 82 by the plurality of screws 101 so that upon forward motion (to the right in Figs. 2 and 5) of the tube guide 12, the guided movement of the screw driven control member 96 effected by the cam groove 99, permits the tube guide 12 to be driven forward at a controlled rate. By virtue of this construction it can be seen that a controlled, rapid movement may be obtained due to the shape of the cam.

As may be best seen in Fig. 3, which is a fragmentary enlargement of the section shown in Fig. 2, but showing the tube 13 partially tapered and on a mandrel 103, a pressure resisting ring 104 lies within the compression chamber 72 around the tube 13 and adjacent the smaller portion of the tapered base plate opening 73. Also within the compression chamber 72 is the deformable tube constricting member, comprising in the present instance a deformable annulus 105 extended concentrically around the tube 13 in position for compression between the pressure resisting ring 104 and the annular compressing ring 106. The compressing ring 106 is provided as an extension of plunger 107 which is movable within the cylindrical chamber 71 and abutted by the plunger 66 for compression movement to the right.

The radial cross section of the deformable annulus 105, i. e., taken in a plane perpendicular to the circumference, may suitably be one of numerous shapes, such as rectangular or polygonal. For tapering relatively large sized tubing, we have found by experiment that a somewhat tapered or wedge-shaped radial cross section is preferable, Fig. 3. The sides of the pressure resisting ring 104 and compressing ring 106 adjacent opposite sides of the deformable annulus 105 are chamfered or otherwise shaped to conform to the initial shape of the deformable annulus 105.

From the structure shown, it becomes apparent that as hydraulic fluid is introduced under pressure into the chamber 84, the head 63 is driven forward (to the right) driving the plungers 66 and 107 forward and compressing the deformable annulus 105 between the pressure resisting ring 104 and compressing ring 106. The tube 13 is thus constricted by deformation of the annulus 105. If during the process of deforming the annulus 105, the tube 13 is simultaneously moved forward through the annulus 105, the tube 13 will be tapered from right to left. The use of a tapered mandrel 103 to support the interior wall of the tube 13 and to guide and limit the taper is optional, being largely influenced by the alloy, size, and wall thickness of the tube 13.

Although in the present instance the tapering die comprising the pressure resisting ring 104, the deformable annulus 105, and the compressing ring 106 are designed for effecting a taper of circular cross section to a tube, it is apparent that tapers of polygonal or irregular shaped cross sections may also be achieved. For example, by utilizing a hexagonal deformable tube constricting member in place of the annulus 105, and corresponding hexagonal members in place of the rings 104 and 106, a tapered tube of hexagonal cross section will be formed. It is also not essential for the aperture of the deformable tube constricting member to encircle the tube 13 completely. The process of the present invention, and a slightly modified tapering die, may accordingly be used to taper only a portion of the circumference of the tube. Thus the present invention provides a method and means for manufacturing tapered tubing in various cross sectional shapes other than circular.

Obviously after the tapering process progresses to the extent that the tube 13 is constricted to a diameter appreciably smaller than the diameter of the pressure resisting ring 104, a tendency develops for the deformable annulus 105 to flow between the constricted tube 13 and the pressure resisting ring 104. For this reason it is preferred that after the tapering process has operated along a suitable length of the tube 13, further deformation of the annulus 105 is prevented by stopping the forward movement of the compressing ring 106.

Thereafter, continued movement of the tube 13 to the right through the die uniformly reduces the diameter of the tube 13 for the remainder of its length. The deformed annulus 105 is then replaced within the compression chamber 72 by a similar but non-deformed annulus 105, having an orifice slightly larger than the constricted orifice of the deformed annulus 105 being replaced. The other parts of the tapering die, including the pressure resisting ring 104 and the compressing ring 106 are similarly replaced by corresponding members of smaller internal diameters adapted for tapering the uniformly reduced portion of the tube 13.

The uniformly reduced portion of the tube 13 is then run backward from right to left, through the funnel opening 91, the tapering die, and into the tube guide 12, until the small end of the taper which was formed during the preceding operation is brought into contact with the new deformable annulus 105. The tapering process is then continued from the small end of the preceding taper to provide a continuous and essentially uniform taper without noticeable discontinuity.

In order to effect the ready exchange of one tapering die with a smaller size, the present invention provides a plurality of tapering dies similar to those shown in Figs. 2 and 3 and arranged according to size in the die holder 11, Figs. 1 and 4, each die being adapted for tapering a tube within a slightly smaller diameter range than the range suitable for the die immediately below. Each die is indicated generally by one of the letters A through F, Fig. 4. The corresponding parts for each die are the same, except for size.

The tapered base plate opening 73, deformable annulus 105, pressure resisting ring 104, and compressing ring 106 for each die have slightly smaller internal diameters than the diameters of the corresponding parts in the die immediately below. In the tapering of tubing of relatively small diameters, as for example fishing poles of approximately three-eighths inch diameter or less, it has been found that a series of tapering dies will provide a suitable continuous taper if the internal diameters of the exchangeable parts of each die are approximately one-sixteenth of an inch smaller than the corresponding parts of the preceding die. Other diameter ranges will be required to satisfy other conditions.

It is to be observed that in the ordinary situation, as in the series of dies A through F, Fig. 4, the effective cross sectional area of each annulus 105 in the series, taken in a plane perpendicular to the longitudinal axis of the tube 13, is preferably the same, regardless of the dimensions of the aperture of the annulus 105. Correspondingly the rings 104 and 106 for each die in the series provide the same area of compression contact with their respective annulus 105. Thus the force applied to the head 63 may be maintained essentially constant throughout the use of the various tapering dies in the series A through F, and the resulting pressure on the opposite faces of the deformable annulus 105 in each case will also remain essentially constant. Otherwise, if each succeeding annulus 105 in the series of dies offered a different cross sectional area perpendicular to the compressing force, the annulus 105 having the smaller cross sectional area would be subjected to a greater force per unit area and would be compressed more rapidly than the similar deformable annulus 105 of larger cross sectional area. Difficulty would thus be experienced in controlling the rate of the taper. Where it is desired to vary the rate of taper along the length of the tube, the cross sectional areas of the various annuli 105 will be correspondingly varied.

The assembled die holder 11 provides the detent notches 116 and is slidably mounted within the opening 67 of the housing 10, which latter is secured to the channel beams 58 and 59 by the plurality of bolts 119 and 120 respectively. Within one side of the housing 10 are the recesses 122 and 123 for the detent mechanism, which latter is held in place by the collar or mounting 124 secured to the channel beam 59 by the plurality of bolts 120.

The detent mechanism comprises the upper and lower plunger arms 125 and 126 slidably mounted within the cylindrical openings 127 and 128 respectively of the mounting 124. The internal portions of the plunger arms 125 and 126 provide the pin slots 129 and 130 respectively for the pins 132 and 133 respectively. The pins 132 and 133 are slidable within their respective slots 129 and 130 and are secured at their opposite ends within the thimbles 134 and 135 respectively, which latter provide the detent tips 136 and 137 respectively for selectively engaging the detent notches 116 and aligning the various tapering dies A through F in turn with the tubular opening of the tube guide 12 and funnel-shaped opening 91. Within the recesses 122 and 123 and around the respective plunger arms 125 and 126 are the coil springs 138 and 139 which are under compression between the thimbles 134 and 135 respectively and the body of the mounting 124 to force the thimbles 134 and 135 to the right against the adjacent side of die holder 11.

Reciprocating movement of the plunger arms 125 and 126 is effected by pivoting the operating lever 142, which is pivotally connected to the exterior ends of the arms 125 and 126 by the pivots 143 and 144 respectively. The operating lever 142 is also pivotally connected at 145, between the pivots 143 and 144, to the projecting support 146 which is secured to the mounting 124 by the plurality of screws 147. Adjusting lock nuts 148 and 149 are screw-threaded on the plunger arms 125 and 126 respectively to permit adjustment of the limit of movement of the plunger arms 125 and 126.

In operation of the apparatus disclosed herein, the tube 13 to be tapered is inserted into the tube guide 12 from either end through a tapering die of properly selected size until the portion of the tube 13 at which the taper is to begin is located within the deformable tube constricting member, i. e., the annulus 105 in the present instance. The portion of the tube 13 which extends forward, i. e., to the right of the funnel-shaped opening 91, is clamped by the jaws of the chuck 14. The brackets 61 for the limit switches 60A are suitably spaced along and immovably secured to the slide 52 in accordance with the desired predetermined length of draw for the successive tapering operations, and the cam arm 62A is rotated to extend perpendicularly to the slide 52, i. e., to the position occupied by the arm 62C in Fig. 1.

The hydraulic pump motor 22 is then started and pressure is supplied to valves 35 and 38. By an electrical control circuit, not shown, the solenoidal actuated valve 35 is operated to deliver hydraulic pressure into the hydraulic pressure chamber 84 via the ducts 30 and 36. When pressure within the line 36 reaches the predetermined value at which constriction of the annulus 105 begins, the pressure switch 44 is tripped and the solenoidal actuated valve 38, electrically connected with the switch 44, is operated to deliver hydraulic fluid under pressure into the left end of the ram 18 via the ducts 28 and 39, and to connect the duct 40 with the drain 37 via duct 37D. Accordingly, the plunger 17 is moved to the right and the tube 13 is drawn through the tapering die.

Simultaneously, the head 63 is gradually driven to the right, Fig. 2, forcing the plunger 66 against the plunger 107 and compressing the annulus 105 between the pressure resisting ring 104 and compressing ring 106 within the cylindrical compression chamber 72. Radial enlargement of the annulus 105 is prevented by the side walls of the compression chamber 72. As the annulus 105 is compressed, it is permitted to flow in one way only. The aperture thereof is consequently constricted around the tube 13, and the latter is correspondingly constricted and tapered as it is drawn through the tapering die. The pitch of the taper is readily controlled by the feed control valve 41 which determines the rate of drawing the tube 13 through the die.

As the tapering process progresses to the extent that the external diameter of the tube 13 becomes appreciably smaller than the internal diameter of the pressure resisting ring 104, the annulus 105 tends to flow between the tube 13 and ring 104, with the result that the rate of constriction of the tube 13 decreases and the pitch of the taper decreases. This result may be partially offset by the provision of the control member 96 which is adapted, by virtue of the cam follower 98 within the cam groove 99, to rotate upon movement of tube guide 12 to the right. Rotation of the control member 96 permits the tube guide 12 to be driven, and consequently the head 63 and other parts of the compression mechanism, to the right at a controlled rate by reason of the screw driving engagement between these members and between the cam follower 98 and cam groove 99, thereby deforming the annulus 105 at a controlled rate. This may be an accelerated rate merely by shaping the cam groove so that there will be less restraining of the contol member 96 as it is rotated due to movement to the right of the guide tube 12. By proper selection and disposition of the cam groove 99, the acceleration of the compression stroke may be adapted to compensate for the flow of the annulus 105 between the tube 13 and ring 104, so as to extend the serviceability of the annulus 105 and to achieve a uniform taper pitch throughout a greater period of the compression stroke than would otherwise be possible.

When the tapering process has progressed for such a length along the tube 13 that the diameter thereof is reduced to the extent that an essentially uniform taper pitch is no longer practicable, the limit switch 60A is tripped by contact with the cam arm 62A. The valve 35 is thereby actuated to stop further compression of the annulus 105 and to direct the hydraulic fluid of ducts 30 and 36 to the reservoir 26 via the discharge ducts 37, 37A, and 37B. Meanwhile the movement of the tube 13 continues to the right until the untapered portion thereof is drawn through the ide and is uniformly reduced to the same diameter as the small end of the taper. The solenoidal valve 38 is then actuated by an electrical control circuit, not shown, to bypass the cylinder 18 and to direct the pressure of duct 28 to the return duct 37 via duct 37D. The movement of tube 13 thus stops.

The next smaller tapering die B in the series A through F is then indexed in alignment with the tube guide 12 by pulling the lever 42 to the left in Fig. 4. The detent tip 136 is withdrawn from the notch 116, allowing the die holder 11 to drop until the spring pressed detent tip 137 engages the same notch 116 which was formerly engaged by the tip 136. In connection with the detent mechanism, it is to be observed that the spacing between the notches 116 is double the spacing between the various tapering dies in the series A through F. Accordingly, only one-half as many notches 116 are required as there are dies. After the lower notch 116 has been engaged by the detent tip 137, the next indexing is effected by pivoting the lever 142 to the right in Fig. 4. The tip 137 is withdrawn from the lower notch 116, permitting the die holder 11 to drop until the second notch 116 from the bottom engages the detent tip 136, thereby indexing the die C at the operative position. Each pivotal movement of the lever 142 releases one die from the indexed position and permits the next higher and smaller die to drop into the indexed position.

Upon indexing the next smaller tapering die in alignment with the tube guide 12, the reduced tube 13, still within the jaws of the chuck 14, is reinserted into the funnel-shaped opening 91. The valve 38 is actuated to connect the duct 40 with the pressure of duct 28, and to connect the duct 39 to the return duct 37, thereby driving the plunger 17 and its attached slidable support 49 to the left, and driving the reduced portion of the tube 13 through the next smaller tapering die. When the small end of the tapered portion of the tube 13, which was formed in the preceding tapering operation, reaches the new deformable annulus 105, continued leftward movement of the tube 13 is blocked. The shock is absorbed by the coil spring 21 which protects the tube 13 from buckling. As the spring 21 is compressed, the pin 19 contacts the button 54 and trips the limit switch 46, stopping the leftward movement of the plunger 17 at the proper position for proceeding with the next tapering operation. The cam arm 62B is now rotated to the limit switch contacting position, so that upon movement of the plunger 17 to the right during the next tapering operation, the arm 62B will contact the limit switch 60B and stop the constriction of the second deformable annulus 105 when the second tapering operation has progressed along the length of the tube 13 for the predetermined practicable distance. The above outlined process is repeated one or more times until the desired overall length of taper is achieved.

The hydraulic pressure system utilized with the present invention provides a readily controlled means for supplying pressure to the deformable annulus 105 and for controlling the rate of drawing the tube 13 through the tapering die, or for reinserting the uniformly reduced tube 13 into the tapering die after a deformed annulus 105 has been replaced by the next smaller size. However, it is to be observed that other methods will suggest themselves to the skilled mechanic for supplying pressure to the deformable annulus 105 or for controlling the movement of the tube 13, without departing from the spirit of the present invention.

Having thus described our invention, we claim:

1. In an apparatus for tapering tubes, the combination of a housing having an aperture therethrough for receiving the tube to be tapered, a die holder slidably mounted in said housing, a tapering die mounted in the die holder, said tapering die being a deformable tube constricting member having an aperture for receiving said tube, means for indexing said die holder relative to said aperture in said housing for aligning the latter with said tapering die, means to draw a tube to be tapered through said tapering die aligned with the aperture in said housing, a compression chamber having pressure resisting walls adjacent the outer periphery and one side of said deformable tube constricting member, a compressing member adjacent the other side of said tube constricting member, and means for actuating concurrently said compressing member and said means to draw the tube.

2. In an apparatus for tapering tubes, the combination of a housing having an aperture therethrough for receiving the tube to be tapered, a die holder slidably mounted in said housing, tapering dies mounted in said die holder, detent means for indexing said die holder relative to said aperture in said housing for aligning the latter with one of the tapering dies, means to draw a tube to be tapered through the tapering die aligned with the aperture in said housing, each of said tapering dies being a deformable tube constricting member having an aperture for receiving said tube, a compression chamber having pressure resisting walls adjacent the outer periphery and one side of said deformable tube constricting member and a movable compression member adjacent the other side of said tube constricting member.

HERBERT F. DIES.
FRED N. BLACKMORE.

REFERENCES CITED

The following references are of record in the file of this patent:

UNITED STATES PATENTS

| Number | Name | Date |
|---|---|---|
| 252,423 | Buckingham | Jan. 17, 1882 |
| 326,097 | Blake | Sept. 15, 1885 |
| 1,912,751 | Batcheller | June 6, 1933 |
| 2,036,206 | Ernst | Apr. 7, 1936 |
| 2,309,637 | Fickett | Feb. 2, 1943 |
| 2,360,528 | Talmadge | Oct. 17, 1944 |
| 2,367,492 | Fickett | Jan. 16, 1945 |

FOREIGN PATENTS

| Number | Country | Date |
|---|---|---|
| 464,923 | Great Britain | Apr. 28, 1937 |